United States Patent [19]

Tamukai

[11] Patent Number: 4,503,441

[45] Date of Patent: Mar. 5, 1985

[54] METHOD OF INITIALIZING PEN RECORDER CARRIAGE POSITION

[75] Inventor: Tadao Tamukai, Tamayama, Japan

[73] Assignee: Alps Electric Co., Ltd., Tokyo, Japan

[21] Appl. No.: 491,934

[22] Filed: May 5, 1983

[30] Foreign Application Priority Data

May 6, 1982 [JP] Japan ........................ 57-74507[U]

[51] Int. Cl.[3] ........................ G01D 9/00; G01D 9/36; G01D 15/16

[52] U.S. Cl. ........................ 346/139 R; 346/46; 346/1.1

[58] Field of Search ........................ 346/46, 139 R, 1.1

[56] References Cited

U.S. PATENT DOCUMENTS 4,405,931 9/1983 Fujisawa ........................ 346/139 R

FOREIGN PATENT DOCUMENTS 89966 6/1982 Japan ........................ 346/139 R

*Primary Examiner*—E. A. Goldberg
*Assistant Examiner*—Patrick W. Foster
*Attorney, Agent, or Firm*—Guy W. Shoup; Gerard F. Dunne

[57] ABSTRACT

A pen recorder has a carriage movable across a sheet of print paper and supporting a rotatable drum with a plurality of pen units mounted thereon. The carriage is movable between a pair of side frames through a print region and a nonprint region. When the carriage is moved by a stepper motor into abutment against one of the side frames which provides a stopper position, the relationship between the phase of the stepper motor and the position of the carriage is determined. Each time a print cycle is finished, the carriage is returned to a home position which is at the other end of the nonprinting region. A desired pen unit can be selected by reciprocating the carriage in an interval within the nonprint region, the interval being spaced from a preset number of increments of angular movement of the stepper motor.

3 Claims, 8 Drawing Figures

METHOD OF INITIALIZING PEN RECORDER CARRIAGE POSITION

BACKGROUND OF THE INVENTION

The present invention relates to a method of driving a pen recorder such for example as an XY plotter, a graphic printer, or an alphanumeric printer.

There have previously been known multicolor pen recorders having a plurality of pens carrying inks of different colors and successively selectable for desired ink colors to effect multicolor printing. Such a multicolor pen recorder is disadvantageous in that it includes a large and heavy carriage for moving the pens. To eliminate this difficulty, there has been developed a selector mechanism including a drum supporting a plurality of pens and rotatable for selecting desired pens.

For initilization of the carriage when starting printing operation, the carriage needs to be positioned first at a stopper position and then at a home position. To establish the stopper position, the prior pen recorder includes a photointerrupter or optoisolator for detecting the carriage and stopping the same. The optoisolator however is costly and must be located highly accurately.

SUMMARY OF THE INVENTION

It is an object of the present invention to provide a method of driving a pen recorder including a carriage, the method being capable of initializing the carriage and selecting a desired color without providing a photointerrupter or optoisolator.

According to the present invention, the above object can be achieved by moving a carriage into abutment against one of side plates which support guide shafts for the carriage to set up a stopper position for initilization, and reciprocating the carriage within an interval out of contact with said one of the side plates for color selection. With the arrangement of the invention, the carriage can be initialized without any special means, and the phase of a stepper motor for driving the carriage and the position of the latter are kept in a constant relationship at all times. Pen recorders therefore can be rendered simpler in construction and can be manufactured by a similar process. The method of driving a pen recorder according to the present invention can print graphic patterns and characters accurately.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
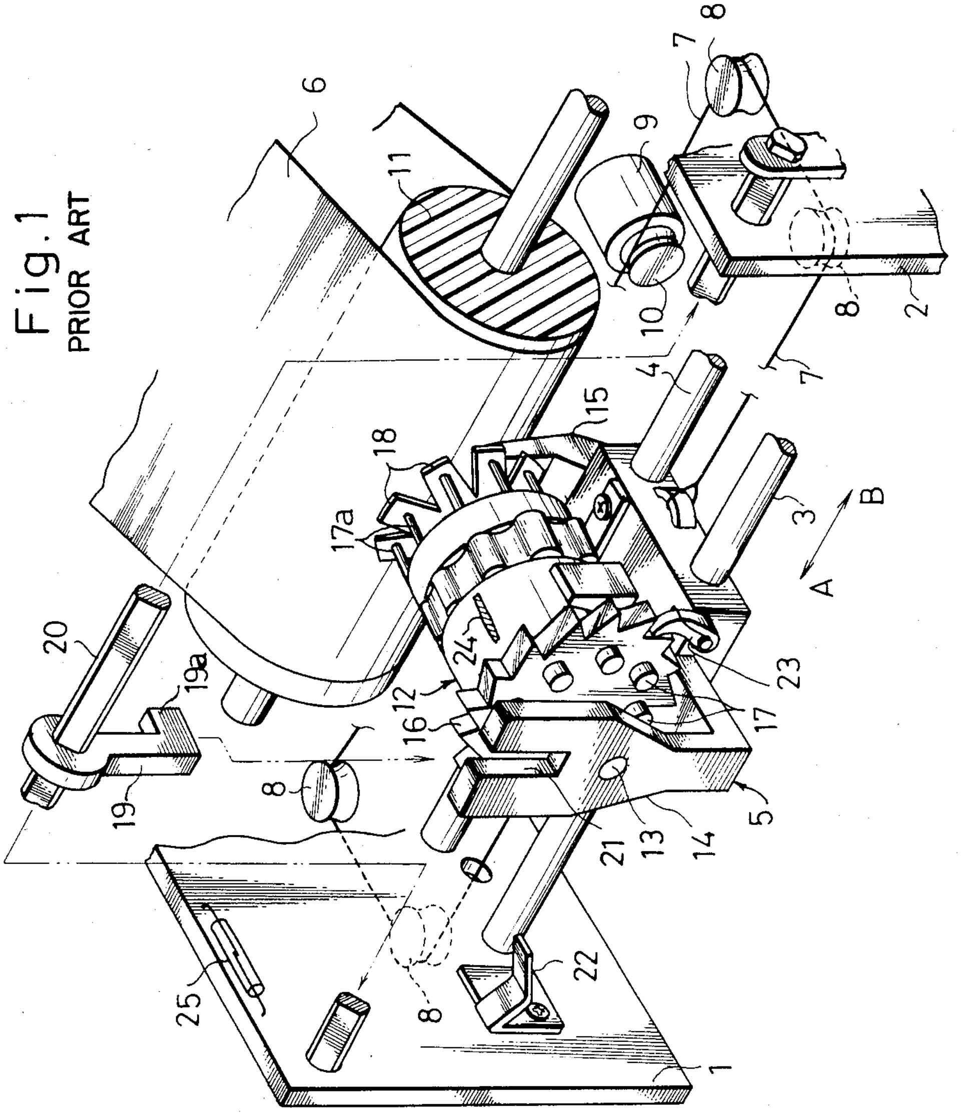
Fig. 1 PRIOR ART
FIG. 1 is a fragmentary perspective view of a conventional pen recorder.

FIG. 1 shows a conventional multicolor pen recorder includes side frames 1, 2, guide shafts 3, 4, a carriage 5, a sheet of print paper 6, a rope or wire 7, pulleys 8, a stepper motor 9, a drive pulley 10, a platen 11, a rotatable drum 12, front and rear side plates 14, 15, a ratchet wheel 16, a plurality of pen units 17, leaf springs 18, a hammer 19, a hammer shaft 20, a slot 21, a ratchet indexing cam 22, a pawl 23 for preventing the ratchet wheel 16 from rotating backward, a permanent magnet 24, and a sensor 25.

The construction of the multicolor pen recorder will be described in greater detail.

The guide shafts 3, 4 extend parallel to each other between the side frames 1, 2, which are transverse to the plane the sheet of print paper 6. The carriage 5 is slidably mounted on the guide shafts 3, 4. The ends of the wire 7 are connected to opposite ends of the carriage 5, and the wire 7 is trained around the pulleys 8 and looped around the drive pulley 10 coupled to the stepper motor 9, which is reversible in its rotation. The carriage 5 can be moved along the guide shafts 3, 4 in the direction of the arrow A or B dependent on the direction in which the stepper motor 9 rotates.

The platen 11 serves as a printing base against which the print paper is pressed on printing and also as a paper feeder. The print paper 6 can be fed longitudinally in one direction or the other dependent on the direction of rotation of the platen 11.

The rotatable shaft 13 extends over the carriage 5 between the front and rear plates 14, 15. The rotatable drum 12 is mounted on the rotatable shaft 13 for corotation. The ratchet wheel 16 is secured or formed integral with the rotatable drum 12, and is allowed by the pawl 13 to rotates only in one direction. The pen units 17 are angularly equidistantly spaced about the rotatable shaft 13, and have pen ends 17a projecting axially beyond the end of the rotatable drum 12 toward the print paper 6. The pen ends 17a are normally urged by the leaf springs 18 to move in a direction away from the print paper 6. Thus, pen ends 17a are kept out of abutting engagement with the print paper 6 and effect no printing under normal conditions. When the hammer 19 disposed in the slot 21 in the front side plate 14 is angularly moved in response to turning of the hammer shaft 20, the hammer 19 strikes the projecting rear end of the pen unit 17 which is located at the uppermost position on the rotatable drum 12, forcing the pen end 17a beyond the associated leaf spring 18 into engagement with the print paper 6 to thereby effect printing thereon.

The pen units 17 may be composed of small-diameter felt pens, for example, impregnated with nonvolatile inks of different colors.

When the carriage 5 moves in the direction of the arrow A on rotation of the stepper motor 9, the ratchet indexing cam 22 finally engages the ratchet wheel 16. The ratchet wheel 16 is angularly moved in one increment or one tooth each time it is engaged by the ratchet indexing cam 22. The drum 12 is also angularly moved to change the positional relationship between the pen units 17 and the print paper 6. The number of teeth of the ratchet wheel 16 is n times greater than the number of the pen units, n being a natural number. Accordingly, each time the ratchet wheel 16 is engaged by the ratchet indexing cam 22, the ratchet 16 is angularly moved through an angular interval which is equal to 1/n of the distance between adjacent pen units 17.

The pen unit 17 which is capable of printing on the print paper 6 is the one that is located at the uppermost position on the drum 12 and hit by the hammer 19. When it is necessary to use other pen units located in other positions for printing, the ratchet wheel 16 should be engaged by the ratchet indexing cam 22 several times. To effect this, the carriage 5 is reciprocably moved to repeat the cycle of engagement and disengagement between the ratchet indexing cam 22 and the ratchet 16 until the drum 12 is turned to select a desired pen unit 17.

The permanent magnet 24 is mounted on the peripheral surface of the drum 12. The pen units 17 carrying differently colored inks are positioned with respect to the permanent magnet 24. The sensor 25 is attached to the side plate 1 and comprises a reed switch, for example, for detecting the permanent magnet 24.

The prior pen recorder thus constructed will operate as follows:

When the stepper motor 9 is supplied with a number of pulses, it is rotated in one direction or the other dependent on the number of pulses supplied. The carriage 5 is accordingly moved in the direction of the arrow A or B through an interval dependent on the number of such pulses. The stepper motor 9 is successively fed with pulses to drive the carriage 5 in the direction of the arrow A or B for a distance determined by the supplied pulses, and at the same time the sheet of print paper 6 is fed longitudinally, while a selected pen units 17 is actuated to print a graphic pattern or a row of characters having a desired color on the print paper 6. When the printing with the selected pen unit 17 is finished, the carriage 5 is moved in the direction of the arrow A to a position (hereinafter referred to as a "home position") in which the selected uppermost pen unit 17 is spaced from the edge of the print paper 6. The carriage 5 is held at rest in the home position until a command for selecting a next pen unit 17 is given.

When such a next command is issued, the carriage 5 is further moved in the direction of the arrow A to cause the ratchet wheel 16 to be engaged by the ratchet indexing cam 22 repeatedly until the next pen unit 17 is selected or brought up to the uppermost position on the drum 12. After selection of the desired pen unit 17, the carriage 5 is moved back in the direction of the arrow B to the home position in which the carriage 5 remains stopped until a next print command is given.

In order to effect proper printing on movement of the carriage 5, it is necessary that the home position be set up and the drum 12 be initialized, a process called as "initialization".

For initialization, the carriage 5 is moved in the direction of the arrow A until it is detected by a photointerrupter or optoisolator (not shown) composed of a light-emitting element and a photodetector. When the carriage 5 is moved past the position where the ratchet wheel 16 is engaged by the ratchet indexing cam 22, the carriage 5 blocks the light path between the light-emitting element and the photodetector, whereupon the photointerrupter issues a signal to stop the carriage 5 in a stopper position (FIG. 2(A)). When the carriage 5 reaches the stopper position before the number of pulses supplied to the stepper motor 9 falls short of a required number, the supply of pulses to the stepper motor 9 is cut off and the stepper motor 9 remains stopped until the required number of pulses is reached. (See a in FIG. 2(A)).

Figure 2A:
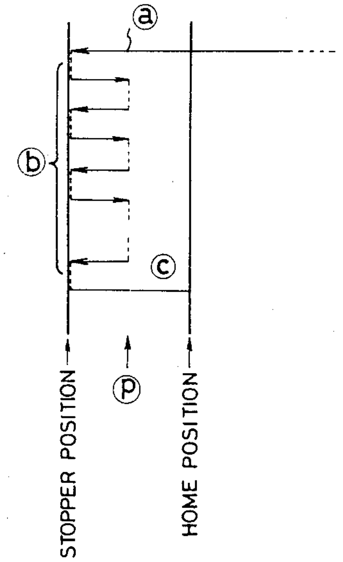
Fig. 2(A) PRIOR ART
FIGS. 2(A) and 2(B) are diagrams illustrative of movements of a carriage in the pen recorder shown in FIG. 1.

After the interval in which the stepper motor 9 is stopped, the carriage 5 is moved back and forth between stopper position and a position (P in FIG. 2(A)) spaced a preset number of pulses from the stopper position in the direction of the arrow B, thus turning the drum 12 until the permanent magnet 24 is detected by the sensor 25. In response to detection of the permanent magnet 24, the reciprocating movement of the carriage 5 is stopped and the drum 12 is now initialized. The foregoing initializing process is indicated by b in FIG. 2(A).

Then, the carriage 5 is moved to the home position (c in FIG. 2(A)), and the initialization of the carriage 5 is finished. The home position is spaced a fixed distance from the stopper position, and can be set up by applying a certain number of pulses to the stepper motor 9 to cause the carriage 5 to move from the stopper position for a certain interval in the direction of the arrow B.

Figure 2B:
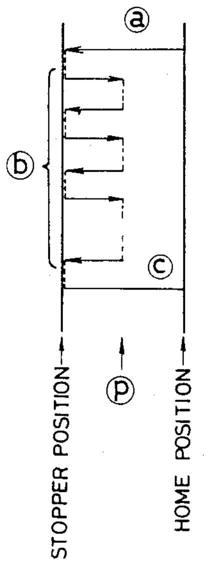
Fig. 2(B) PRIOR ART

When a certain color is to be printed, the carriage 5 is moved from the home position in the direction of the arrow A to the stopper position in response to a color selection command, as shown at a in FIG. 2(B). Then, the carriage 5 is reciprocably moved repeatedly a specified number of times betwen the stopper position and the position P for selecting the pen unit carrying the ink of the desired color, as illustrated at b in FIG. 2(B). The number of such reciprocable movements of the carriage 5 is determined by the positional difference between the previously selected pen unit prior to generation of the color selection command and the pen unit to be selected, and the drum 12 is angularly rotated through an angle corresponding to such positional difference to select the pen unit with the desired color ink. After the color selection, the carriage 5 is moved to the home position in which it awaits a print starting command, as shown at c in FIG. 2(B).

Figure 3:
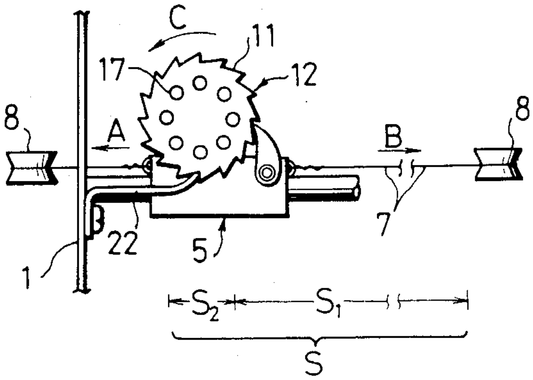
Fig. 3 PRIOR ART
FIG. 3 is a fragmentary side elevational view of the carriage, showing a region in which the carriage is movable.

In FIG. 3, the selected uppermost pen unit on the drum 12 is movable in a region S in response to movement of the carriage 5. The region S is composed of a subregion S1 (hereinafter referred to as a "print region") in which the selected pen unit is capable of actual printing and a subregion S2 (hereinafter referred to as a "nonprint region") in which the selected pen unit is incapable of printing. The foregoing initialization and color selection is carried out in the nonprint region.

With the prior pen recorder, the optoisolator is provided to establish the stopper position for the carriage 5. The optoisolator is required to be placed between the position in which the ratchet wheel 16 can be turned by the ratchet indexing cam 22 and the stopper position. The optoisolator therefore has to be located in a small space. Since the stopper position serves as a reference to determine the home position, the optoisolator needs to be positioned highly accurately.

The optoisolator renders the pen recorder costly and requires an additional process for accurate positioning thereof in the manufacture of the pen recorder, the process also adding up to the cost.

The present invention will now be described with reference to FIGS. 4 through 6.

Figure 4:
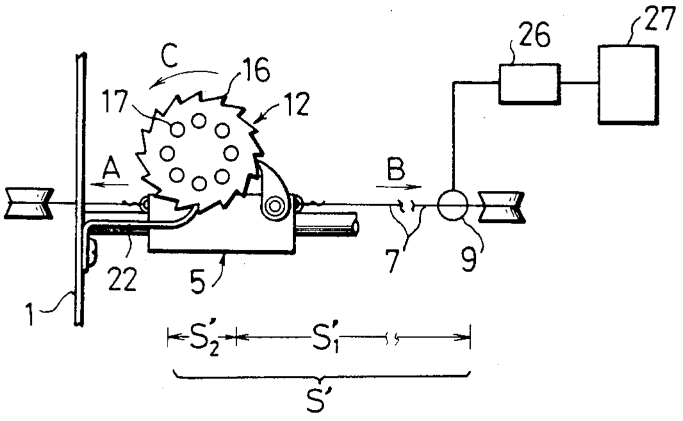
FIG. 4 is a fragmentary side elevational view of the carriage, explanatory of a method of driving a pen recorder according to the present invention.

FIG. 4 is illustrative of a method of driving a pen recorder according to the present invention. Designated at 26 is a driver circuit and 27 a microcomputer. Like or corresponding parts in FIG. 4 are denoted by like or corresponding reference characters in FIG. 3, and will not be described in detail.

In FIG. 4, the carriage 5 is movable through a region S′ in which the selected uppermost pen unit 17 on the drum 12 is movable, the region S′ being composed of a print region S1′ and a nonprint region S2′.

The microcomputer 27 is programmed to print desired characters and graphic patterns on a sheet of print paper (not shown). The microcomputer 27 issues a succession of pulses based on the program, which are supplied through the driver circuit 26 to the stepper motor 9. The stepper motor 9 is rotated in one direction or the other dependent on the supplied pulses, causing the carriage 5 to move in the direction of the arrow A or B.

It is now assumed that the carriage 5 is movable through the region S′ in 273 increments or steps, and through the nonprint region S2′ in 45 increments or steps.

When the program for desired figures and characters is loaded into the microcomputer 27 and a print starting command is issued by the microcomputer 27, the following initilization is performed:

The microcomputer 27 supplies the stepper motor 9 with successive pulses for initilization. The stepper motor 9 rotates in 273 steps of movement of the carriage 5 to enable the latter to move from any position in the direction of the arrow A. When the carriage 5 is moved in this direction, the ratchet wheel 16 is turned one tooth by engagement with the ratchet indexing cam 22. The carriage 5 is further moved in the same direction until it is stopped on abutment against the side frame 1. The stepper motor 9 keeps rotating until all of the pulses corresponding to 273 steps are supplied to the stepper motor 9, during which time the carriage 5 is held against the side frame 1. Accordingly, the side frame 1 serves as a stopper, and the position in which the carriage 5 is held against the side frame 1 is set up as the stopper position.

Figure 5A:
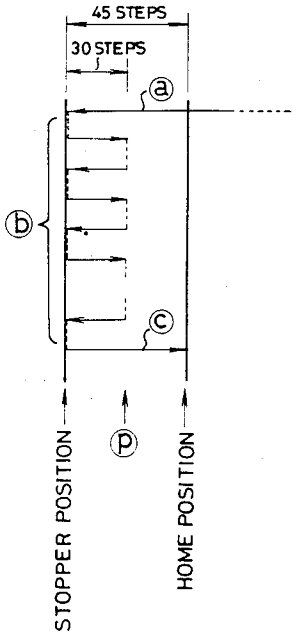
FIGS. 5(A) and 5(B) are diagrams showing movements of the carriage of FIG. 4.

Then, the carriage 5 is reciprocated a preset number of times between the stopper position and a position P spaced 30 steps therefrom in the direction of the arrow B in the same manner as that described above with reference to FIG. 2(A), thus initializing the drum 12. Then, the carriage 5 is brought to and stopped in the stopper position, and is shifted 45 steps in the direction of the arrow B, whereupon the home position is established and the carriage 5 is initialized. The foregoing operation is shown in FIG. 5(A).

Figure 5B:
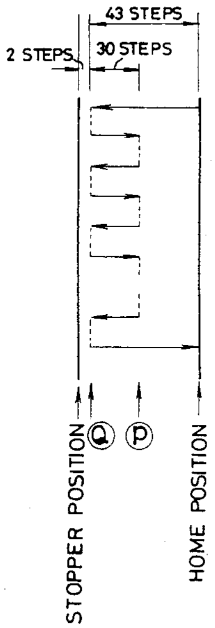

The microcomputer 27 then issues a color selection command, and pulses based thereon are supplied to the stepper motor 9. The carriage 5 is moved 43 steps in the direction of the arrow A as shown in FIG. 5(B) to set up a position Q, which is spaced two steps from the stopper position in the direction of the arrow B. The ratchet wheel 16 is engageable by the the ratchet indexing cam 22 in the position Q. The carriage 5 is reciprocated for a stroke equal to 30 steps in a predetermined number of cycles until a desired pen unit 17 is selected. Thereafter, the carriage 5 returns to the home position.

The microcomputer 27 now delivers a print starting command, and the stepper motor 9 is supplied with pulses based on the print starting command to print desired characters or a figure with the selected pen unit 17.

After the printing operation with the selected pen unit 17, the carriage 5 is moved to and retained in the home position. The carriage 5 is then actuated for the color selection as shown in FIG. 5(B) under the control of a next color selection command. The foregoing cycle of color selection and printing is repeated until all data programmed in the microcomputer are printed, at which time any color selection command is no longer issued while the carriage 5 is in the home position.

Figure 6:
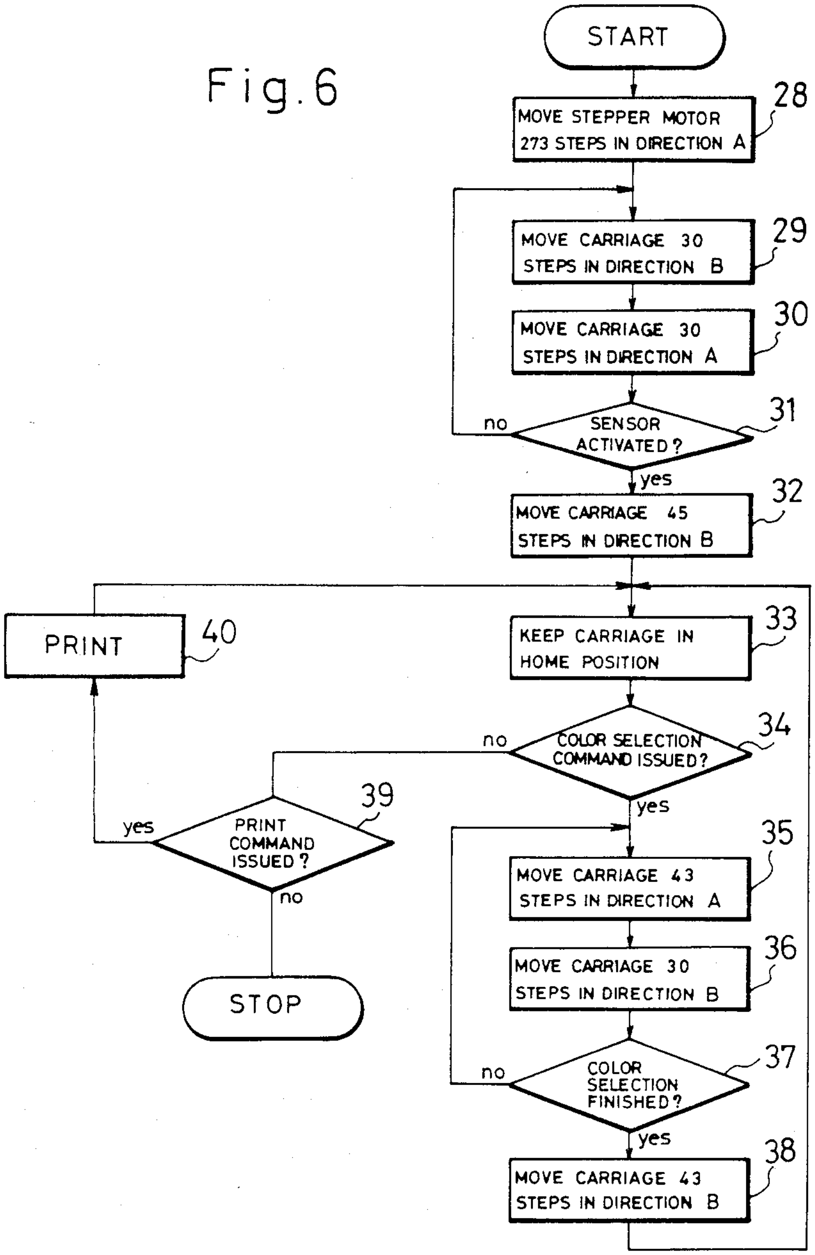
FIG. 6 is a flowchart showing operations of a microcomputer shown in FIG. 4.

FIG. 6 is a flowchart showing the foregoing operation. In the flowchart, initialization is effected from steps 28 through 32, and color selection is carried out from steps 34 through 38.

With the arrangement of the present invention, the side frame 1 (FIG. 4) is used as a stopper providing the stopper position, and the home position is determined on the basis of this stopper position. Accordingly, no photointerrupter or optoisolator is required, and the stopper position can accurately be established. During color selection operation (FIG. 5(B)), the carriage 5 is kept out of abutment against the side frame 1 for the reason that the position of the carriage 5 and the phase of the stepper motor 9 can be maintained in a constant relationship in a series of printing cycles. More specifically, the phase of the stepper motor 9 and the position of the carriage 5 are at random prior to printing operation. Upon initilization as shown in FIG. 5(A), the phase of the stepper motor 9 and the position of the carriage 5 are kept in a certain relationship, which must be maintained subsequently until a series of continued printing cycles are finished. If there were no such relationship, the home position would change each time the carriage 5 would return thereto, and as a result multicolor figures drawn by different pen units would be out of registry. The desired relationship between the phase of the stepper motor 9 and the position of the carriage 5 would be highly likely to be lost if the carriage 5 were moved into abutment against the side frame 1. During color separation, therefore, the carriage 5 is moved back and forth between the position Q two steps spaced from the stopper position and the home position.

The numbers of steps referred to above for initialization of the carriage 5 and color selection are by way of example only, and should not be interpreted as being limitative. The present invention is applicable to other pen recorders provided pen units are mounted on rotatable drums.

Although a certain preferred embodiment has been shown and described, it should be understood that many changes and modifications may be made therein without departing from the scope of the appended claims.

What is claimed is:

1. A method of driving a pen recorder including a carriage supporting a rotatable drum with a plurality of pen units mounted thereon and a stepper motor for driving the carriage across a sheet of print paper through a print region in which the pen units can effect printing and a nonprint region in which the pen units can effect no printing, said method comprising the steps of:

moving said carriage to a stopper position at an end of said nonprint region by rotating said stepper motor through a predetermined number of increments, thereby establishing a fixed relationship between the phase of said stepper motor and the position of said carriage;

moving said carriage through said print region to allow a selected pen unit to effect printing on the sheet of print paper in a printing cycle;

returning said carriage to a home position at an opposite end of said nonprint region after each printing cycle; and reprocating said carriage in an interval between said stopper position and said home position while angularly moving said rotatable drum until a desired pen unit is selected for a next printing cycle, said interval excluding said stopper position, so that said home position can be fixed with respect to said stopper position until all desired printing cycles are performed.

2. A method according to claim 1, wherein said carriage is movable between a pair of side frames, said stopper position being defined by one of said side frames.

3. A method according to claim 1, wherein said interval is spaced from said stopper position by a preset number of increments of angular movement of said stepper motor.

* * * * *